Sept. 12, 1961 G. B. FOSTER 2,999,935
CONVERTIBLE RADIATION SOURCE
Filed Oct. 30, 1957 3 Sheets-Sheet 1
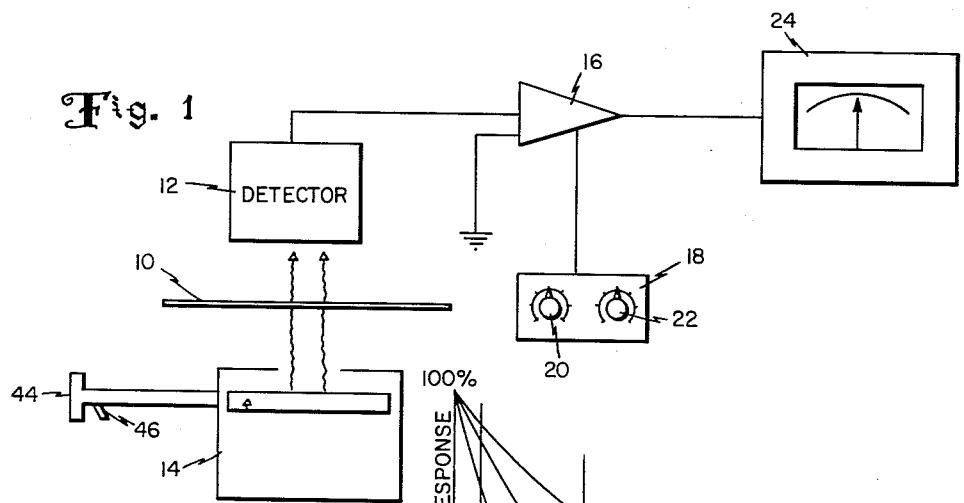
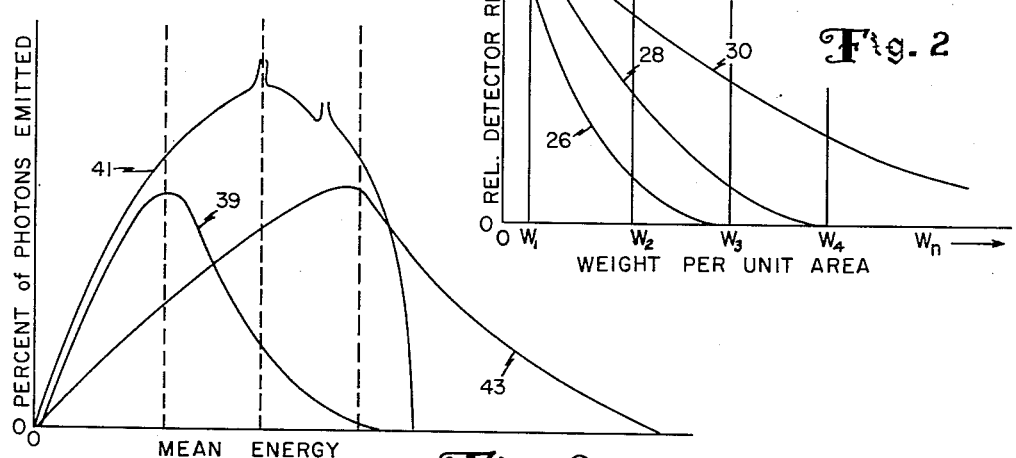
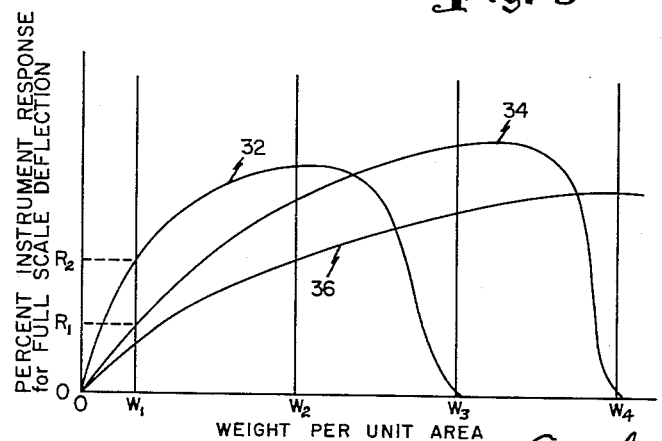
INVENTOR
GEORGE B. FOSTER Sept. 12, 1961 G. B. FOSTER 2,999,935
CONVERTIBLE RADIATION SOURCE
Filed Oct. 30, 1957 3 Sheets-Sheet 2
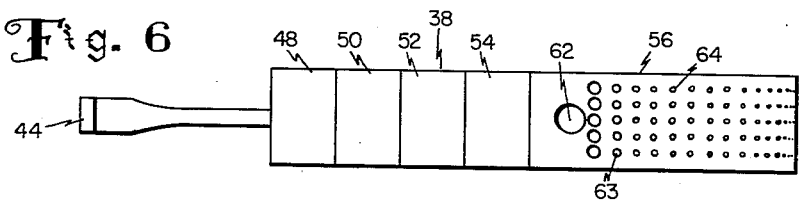
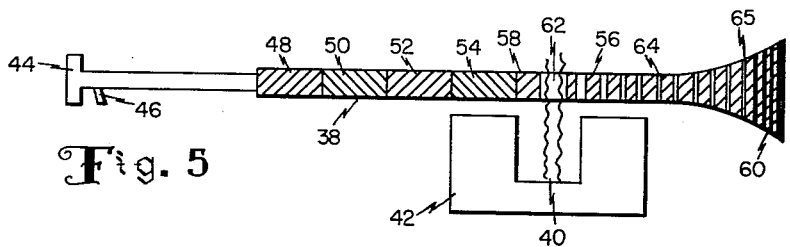
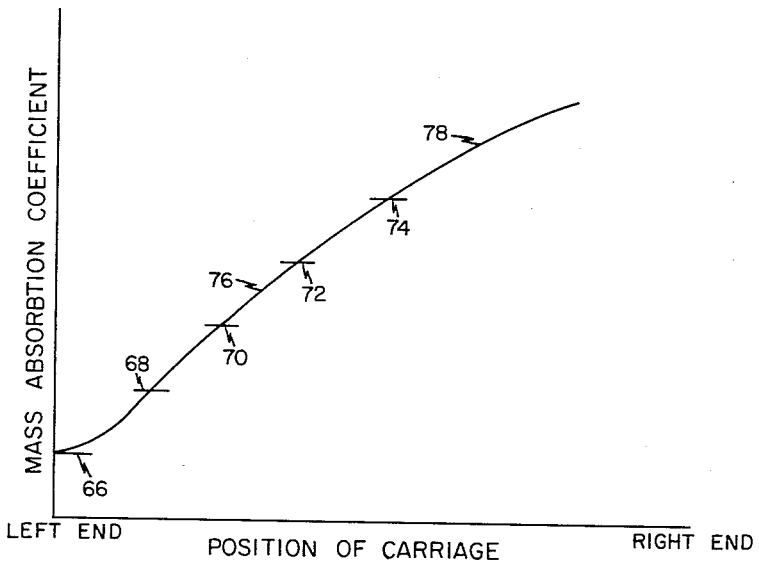
INVENTOR
GEORGE B. FOSTER Sept. 12, 1961 G. B. FOSTER 2,999,935
CONVERTIBLE RADIATION SOURCE
Filed Oct. 30, 1957 3 Sheets-Sheet 3
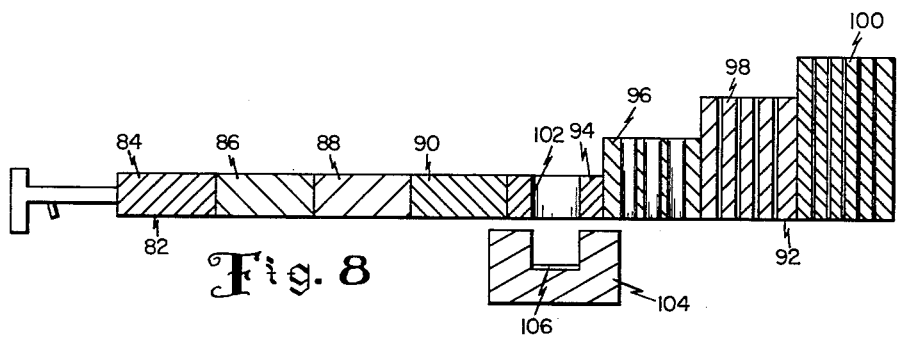
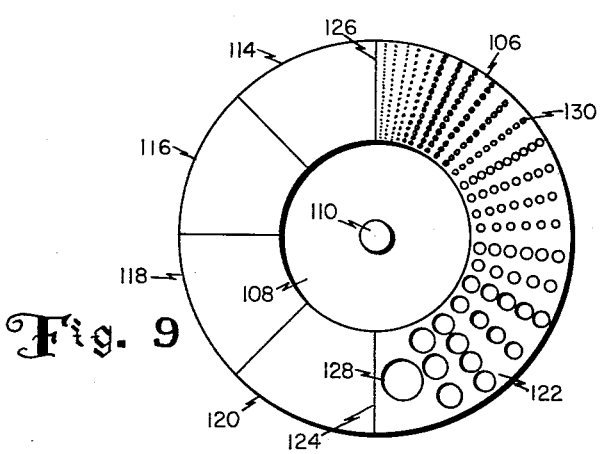
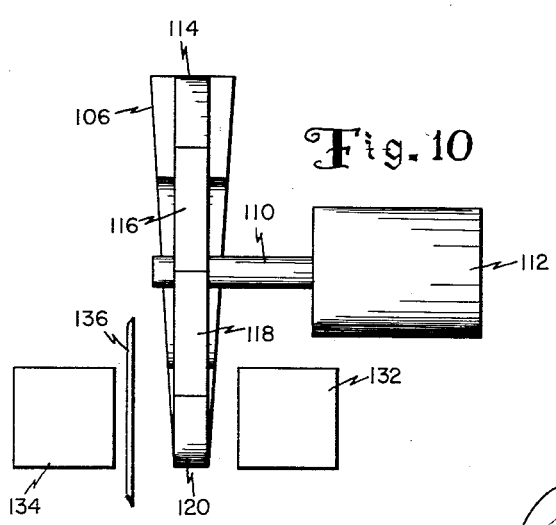
INVENTOR
GEORGE B. FOSTER United States Patent Office 2,999,935
Patented Sept. 12, 1961

2,999,935
CONVERTIBLE RADIATION SOURCE
George B. Foster, Worthington, Ohio, assignor to Industrial Nucleonics Corporation, a corporation of Ohio
Filed Oct. 30, 1957, Ser. No. 693,290
5 Claims. (Cl. 250—83.3)

This invention relates to a method and apparatus for radiation technique measurements of density and various other characteristics of materials. More particularly the invention relates to a method and apparatus for providing optimum radiation energy for the accomplishment of a wide range of measurements on various materials by radiation absorption and reflection methods.

The measurement of thickness, weight, density, profile and a wide range of other characteristics of materials through the use of radiation gauges disposed in various geometric relationships has become quite common and both X-ray tubes and radioactive sources have been used. Commercial X-ray equipment, however, is expensive, bulky, complicated to operate, and requires a certain amount of servicing. In addition, the intensity of the radiation produced by such equipment is less stable than the intensity of radiation emitted by radioisotopes.

On the other hand, measuring devices using radioactive sources of radiations, such as radioisotopes, have been limited in their usefulness because compromises must be made in the selection of the energy of the radiation source with relation to the range of materials to be measured with that source. That is to say, the designer of measuring devices using radioisotopes is limited in his selection of mean energies of radioactive radiations by considerations of cost, availability and half-lives of radioactive isotopes. While practical radioisotopes are available for emitting high energy gamma rays to provide all of the penetrability desired, the manufacturing, handling and storage of the capsules containing such gamma ray emitters requires extreme precautions and expensive facilities.

Several methods have been suggested for modifying or influencing the nature of the emanations which are ultimately used in making the desired measurements. Thus Atchley in United States Patent No. 2,629,831 shows a reflective method of obtaining attenuated beta radiation. Foster et al. in copending application Serial No. 434,786, filed June 7, 1954, now Patent No. 2,933,606, show a method of increasing the penetrability of primary beta radiation. Baldwin Instrument Company et al. in British Patent 689,857 of April 8, 1953, show a fixed collimation system using a pair of collimating filters. Also numerous workers have shown nulling gauging systems using absorbing wedges to attenuate radiation. Examples of such systems may be found in United States Patents Nos. 2,586,303 to Clarke and 2,678,399 to Fay.

While these prior methods increase the range of mean energy levels available to the equipment designer over and above the energies available by reason of the radioactive disintegration action alone, they still restrict him to the use of the particular type of energy source and the particular energy which he has selected. Gauges designed to use such sources are thus restricted in usefulness to the results obtainable through the use of the selected energy alone.

It is accordingly a primary object of this invention to provide a method and apparatus for making measurements through the use of radiation techniques which eliminates restrictions on equipment performance dictated by the radiation source and/or the sensitivity of the read-out device.

It is another object of the invention to provide a radiation technique method and apparatus for measuring a range of characteristics of materials greatly in excess of that possible with any prior equipment.

It is another object of the invention to provide a radiation technique measuring apparatus capable of performing the foregoing functions at a lower cost than would be possible with any collection of previously available equipment.

It is still another object of the invention to provide a device capable of producing a large variety of radiation energy spectra, or a large range of mean radiation energies, utilizing but a single radioactive source.

It is another object of the invention to provide a source of corpuscular radiations having a continuously variable mean energy of radiation.

It is still a further object of the invention to provide a method and apparatus of the foregoing type which permits a measurement of an extremely wide range of energy translating properties of materials.

These and further objects and advantages of the invention will become apparent upon reference to the following specification and claims and appended drawings wherein:

FIGURE 1 is a schematic representation of a radiation measuring device, such as a thickness gauge, employing one embodiment of the present invention;

FIGURE 2 presents a series of calibration curves obtained using the apparatus of FIGURE 1 and depicting the relative response of the detector and read-out device as a function of the thickness of the material being gauged;

FIGURE 3 is a graph showing radiation energy spectra corresponding to the energy translating characteristics shown in FIGURE 2;

FIGURE 4 is a graph showing percent instrument response necessary to obtain full scale meter deflection, a function of sensitivity, plotted against weight per unit area or material thickness for the three calibration curves shown in FIGURE 2;

FIGURE 5 is a side elevation of an apparatus for obtaining a large number of radiation energy spectra characteristics from a single primary source of radiation;

FIGURE 6 is a plan view of the apparatus of FIGURE 5;

FIGURE 7 is a graph showing the mass absorption coefficient of a given material plotted against the position of the movable member of the device shown in FIGURES 5 and 6.

FIGURE 8 is a vertical section of another embodiment of an apparatus for obtaining a large number of radiation energy spectra characteristics from a single primary source of radiation;

FIGURE 9 is an elevation of still another embodiment of an apparatus for obtaining a large number of radiation energy spectra characteristics from a single primary source of radiation; and FIGURE 10 is a side view of the apparatus of FIGURE 9.

Referring to FIGURE 1, which shows one embodiment of a device employing the present invention, a material 10, some characteristic of which is to be measured, is placed between a radiation detector 12, such as an ionization chamber, and a source of radiation generally indicated at 14. For purposes of illustration it is assumed that it is desired to measure the thickness of the material.

The radiation flux received by the radiation detector 12 is translated into an electrical signal and this is fed to an amplifying means 16. A measuring device 18 is associated with the amplifying means 16 and is provided with a control 20 for setting the operating point of the amplifier corresponding to a particular weight of material to be measured. Measuring device 18 also contains a sensitivity control 22 for adjusting the response of the indicating device to the span of variation of the measured characteristic of the material to be measured. The measurement information is presented or indicated on a readout device or meter 24 which is of the center scale zero type. A gauging system of this nature is described in detail in the copending application of Henry R. Chope, Serial No. 286,220, filed May 5, 1952, now U.S. Patent No. 2,829,268.

Such a measuring device 18 is of the null balance type wherein the control 20 adjusts a bucking signal so that the read-out meter 24 reads the difference between the bucking signal and the amplified version of the signal from the detector 12. The ordinate of the graph of FIGURE 2 thus may represent the position of control 20 between its two extremes, which are represented upon the graph as zero and 100%. For any thickness of material within the range of the instrument there is some setting of control 20 which causes the meter 24 to read zero. This setting is an indication of the relative response of the detector.

It will be apparent to those skilled in the art that a calibration or absorption curve can be prepared relating relative detector response to material thickness. With such an absorption curve available, the unknown thickness of a sample can be quickly determined by placing the sample in the gauge, adjusting the control 20 until the meter 24 reads zero, and reading the thickness from the point on the absorption curve which corresponds to the setting of control 20. Sample calibration or absorption curves are shown in FIGURE 2.

While maximum accuracy is obtained in this manner it is generally desirable to calibrate the instrument so that the scale of the meter 24 is direct reading over a practical range of thickness, making it unnecessary to readjust the control 20 or to refer to the absorption curve when measuring thickness within that range. It is in order to perform this function that the sensitivity control 22 is provided. This control adjusts the response of the meter 24 to a given voltage variation from the null balance condition. That is to say, if it is desired to measure a certain specified span or range of thickness (or other property) of some particular material, a certain variation in relative detector response is available. The sensitivity control 22 makes it possible to spread this variation over the entire scale of the meter 24. In other words, the range of thickness is spread over full scale of meter 24.

It will be obvious that if the span or range of weights to be measured is excessively large, this direct reading arrangement will introduce an error due to the non-linearity of the absorption calibration curve. Further, as a practical matter, the span of a weight range is also limited by the fact that it is normally desired to be able to read the meter to three digits.

It will also be apparent that there are practical limits on the minimum span of weight range as a result of certain statistical noise signals generated in the device. That is to say, at excessive weight range spans the statistical noise to signal ratio becomes excessive or, expressed in other words, the noise level becomes objectionable when the sensitivity is increased too much.

In order to facilitate an understanding of the characteristics of a measuring system of this type let it be assumed that the sensitivity control is set to provide a span equal to a given percentage of the center span thickness or weight per unit area to be measured. That is to say, for a center span thickness of 10 the full scale meter deflection corresponds to a weight per unit area span of 9.5–10.5. This provides a uniform percentage of accuracy when comparing the reaction of the measuring device to different center span thicknesses.

Let us assume, without further description for the time being, that the radiation source 14 is capable of producing a plurality of different radiation energy spectra, and that the detector and measuring instrument have been calibrated for three of these spectra as shown by the curves 26, 28 and 30 in FIGURE 2. Radiation energy spectra curves which correspond to the absorption curves 26, 28 and 30 are shown in FIGURE 3 at 39, 41 and 43.

Referring to FIGURE 2, there are shown four weights or thickness $W_1$, $W_2$, $W_3$, and $W_4$ which it is desired to measure. Using these weights as center span weights, let it be assumed that the weight span of the measuring device in measuring each weight is 10 percent of that weight. The sensitivity control 22 is then set to spread this weight span over the full scale of meter 24. As examples: if $W_2$ is 100 the weight span is 10 and meter 24 reads from 95 to 105. If $W_1$ is 1 the weight span is 0.1 and meter 24 reads from 0.95 to 1.05.

It will be apparent to those skilled in the art that in order to obtain good instrument accuracy a relatively high relative detector response is desirable for the particular span or range being measured. If the slope of the absorption curve is too low at the center span weight the relative detector response is also low and poor accuracy results. Using spans equal to 10 percent of the center span weight, as discussed hereinabove, the relative detector response available for any given center span weight can be determined graphically from the absorption curves of FIGURE 2.

Consider, as an example, a weight of 100. As pointed out previously the span is 10 percent of this, or 10, and the low and high span weights are 95 and 105. Entering the abscissa in FIGURE 2 with a weight of 105, a relative detector response is obtained for the particular absorption curve in use. Let us call this the high scale relative detector response. A low scale relative detector response can similarly be obtained by entering the abscissa of FIGURE 2 with a weight of 95. If now the low scale relative detector response is subtracted from the high scale relative detector response the relative detector response span is obtained. Since the sensitivity control is set to spread this relative detector response span over full scale, the relative detector response span may also be referred to as the percent instrument response for full scale deflection. When the percent instrument response for full scale deflection is too low instrument sensitivity is set too high and instrument readings are inaccurate for the reasons pointed out hereinabove. A high percent instrument response for full scale deflection is thus desirable. The percent instrument response for full scale deflection for absorption curves 26, 28 and 30 has been plotted in FIGURE 4 as curves 32, 34 and 36 respectively.

Consider now the three calibration curves 26, 28 and 30 in FIGURE 2 and a measurement of the weights $W_1$, $W_2$, $W_3$, and $W_4$. It is readily apparent that the quantity $W_4$ cannot be successfully measured by means of the absorption curve 28 inasmuch as this weight of material is simply too thick to permit sufficient radiation flux to reach the detector. Stated in another manner, the slope of curve 28 is insufficient at $W_4$ so that the percent instrument response achieved is substantially zero as shown by curve 34 in FIGURE 4. This corresponds to an infinite sensitivity and if any signal at all is obtained it is completely unreliable because of the statistical signal to noise ratio.

Considering measurement of the quantity $W_1$, it will be apparent that the absorption curve 28 is not very satisfactory because of the small percent instrument response which must be utilized in order to obtain full scale deflection of the meter. This is shown at $R_1$ in FIGURE 4. Stated another way, the slope of curve 28 is insufficient at this low weight and the relative response of the detector must be spread out excessively so that the signal to noise ratio renders the reading unsatisfactory.

While absorption curve 28 could not satisfactorily be utilized to measure the quantities $W_1$ and $W_4$, it can, however, be quite satisfactorily utilized to measure the quantities $W_2$ and $W_3$. Thus turning to FIGURE 4 it will be seen that a relatively high percent instrument response for full scale deflection is obtained with curve 34 for both $W_2$ and $W_3$.

While the quantity $W_1$ could not be satisfactorily measured using the absorption characteristic shown by curve 28, this quantity can be effectively measured by using an absorption characteristic such as that shown at 26 in FIGURE 2. Turning to FIGURE 4, wherein the percent instrument response for full scale deflection is plotted against weight per unit area, it will be seen that the percent instrument response $R_2$ obtained with curve 32 (corresponding to curve 26 in FIGURE 2) is almost double the percent instrument response $R_1$ obtained for this same weight with curve 34 (corresponding to curve 28 in FIGURE 2). This same absorption characteristic 26 in FIGURE 2 (curve 32 in FIGURE 4) can be quite effectively used to measure the quantity $W_2$. The absorption characteristic 26, however, obviously could not be utilized to measure the quantity $W_4$.

While $W_4$ could not be satisfactorily measured by either absorption characteristics 26 or 28, this quantity can be measured by absorption characteristic 30 in FIGURE 2. Turning to FIGURE 4 it will be seen that the percent instrument response curve 36 corresponding to absorption characteristic 30 in FIGURE 2 gives a very adequate percentage instrument response at the weight $W_4$. Absorption characteristic 30 can also be used to measure the weight $W_3$ and is almost as accurate as absorption curve 28 (percent response curve 34) for that purpose. On the other hand, absorption characteristic 30 could be used to measure quantity $W_2$ but its performance in so doing would not be as satisfactory as would absorption characteristic 26 (percent response curve 32).

It will thus be apparent that if a radiation source capable of producing a plurality of different radiation energy spectra was available, a single gauge would be capable of measuring a large range of properties and would be able to measure such properties with a much higher degree of accuracy than has heretofore been possible. Referring to FIGURES 5 and 6 there is shown a device for providing such a radiation source. An elongated carriage or target assembly 38 is mounted for longitudinal sliding movement over a radioactive beta emitting source 40 mounted in a collimating capsule 42. A handle, such as the handle 44, is provided for sliding the target assembly and a suitable locking means 46 is provided to lock the target assembly in position between movements.

The target assembly consists of a plurality of different materials 48, 50, 52 and 54 which are joined together in any suitable manner and which have a tapered wedge shaped member 56 attached thereto. The wedge shaped member 56 has an end 58 of the same cross section as the last material 54, to which it is attached, and is provided with a large aperture 62 in this end. The other end of this member is bell shaped, as shown at 60, and a large number of holes 64 pierce this bell shaped end. The holes 64 decrease in diameter from a maximum adjacent hole 62, to a minimum at the bell shaped end 60. An increasing number of holes per unit of area is provided as the bell shaped end is approached.

The materials 48, 50, 52 and 54 are used as bremsstrahlung radiation generators by reason of their placement in the path of the beta radiation flux emitted by the radioactive beta emitting source 40. As is taught in the aforementioned Foster et al. application, Serial No. 434,786, filed June 7, 1954, the mean energy of the secondary radiation generated within the material exposed to the primary beta radiation is a function, among other things, of the target material itself, particularly its atomic number. Target materials 48, 50, 52, 54 and 56 of various types may be used, including, as examples, lead, carbon, aluminum, iron, copper, etc. Preferably each target material 48, 50, 52 and 54 is sufficiently thick to stop 98% of the beta rays which would otherwise reach the material to be measured.

While the target materials themselves 48, 50, 52, 54 and 56 have discrete boundaries therebetween, the target assembly or carriage 38 is so mounted that its positions are not restricted to discrete locations corresponding to the segmental length of these materials. The target assembly may be positioned at any point along its longitudinal travel so that the primary beta radiation may impinge upon varying portions of two materials at the same time, thereby generating a net mean photon energy of resulting radiation which lies between the two energies which would result by irridation of either of the two materials alone.

Referring to the wedge shaped member 56, it will be seen that the thickness of the member increases as its end 60 is approached. Parallel holes 64 are provided and these progressively increase in number and decrease in diameter as the end 60 of the member is approached. The radiation produced by the source 40 is inherently a multidirectional radiation directed in all directions within the 180° defined by the horizontal plane which is the floor of the capsule 42. Some collimation is provided by the capsule, but the beta rays emanating therefrom are not completely parallel. When the large aperture 62 overlies the beta source 40 in capsule 42, very little additional collimation is effected so that the radiation emanating from aperture 62 possesses basically the same mean energy as the radiation emanating from the capsule. When the wedge shaped member is moved to the left in FIGURE 5, a series of apertures 63 overlie the source 40. The diameter of these apertures is less than that of aperture 62 and the total area of the apertures overlying the source 40 is reduced. This effects an additional collimation and reduces the mean energy of primary beta radiation emanating from the upper portion of the wedge shaped member 56. As the wedge shaped member is moved still farther to the left in FIGURE 5, a larger number of even smaller apertures 65 are brought into registry with the aperture in capsule 42. In addition to this the thickness of the wedge is increased so that additional collimation is effected both through the reduction in aperture size and the length of the collimating apertures. This results in an additional lessening of the energy of primary beta radiation passing through the wedge shaped member. It will thus be seen that while the portion of the carriage 38 comprised of materials 48, 50, 52 and 54 acts as a bremsstrahlung generator, the wedge shaped member 56 does not, but acts as a variable collimating device producing primary beta radiation of varying mean energy. Section 56 need not necessarily be of a varying thickness if varying diameter apertures are used, although this provides an additional variation in collimation; nor do the apertures have to be of varying diameter if a thickness variation is used. A graduated degree of collimation is desired and this may be effected by any suitable means, such as a variation in aperture diameter or wedge thickness or both.

FIGURE 7 shows a relationship obtained with a certain set of materials wherein the effective mass absorption coefficient resulting from irradiation of the various materials is plotted against the position of the target assembly or carriage 38. In such an arrangement the secondary radiation is allowed to emit from an orifice in the source 14 (FIGURE 1), passes through the material to be measured and is detected by the detector 12. The horizontal line 66 in the graph indicates the mass absorption coefficient obtained when the primary beta source 40 irradiates only the material 48. The horizontal lines 68, 70 and 72 likewise represent the mass absorption coefficients obtained when the primary beta radiation source irradiates target materials 50, 52 and 54, respectively. By adjusting the size of the collimating aperture in the capsule 42, which contains the primary beta radiation source 40, and the width of the target materials 48, 50, 52 and 54, it is possible to provide a relatively smooth change in the mass absorption coefficient as the position of the carriage or target assembly 38 is varied, as is shown by curve 76 in FIGURE 7. While such a smooth curve may be obtained it will be recognized by those skilled in the art that this is by no means essential and that stepped characteristics may be used.

The horizontal line 74 in FIGURE 7 represents the mass absorption coefficient obtained when the aperture 62 in member 56 is adjacent the primary beta radiation source 40 and the radiation used is primary radiation. As the right end of the target assembly comprising the bell shaped member 64 is moved over the primary beta radiation source, primary beta radiation is used and a further variation in mass absorption coefficient is obtained through the varying depth and diameter of the collimating holes 64. By utilizing a sufficiently large number of holes and providing for a gradual variation in their diameters and in the thickness of the member 56, a smooth mass absorption coefficient curve 78 can be obtained as the position of the carriage or target assembly is changed. As pointed out hereinbefore it is not essential that this curve be smooth.

The target materials 48 and 50, as an example, may produce energy absorption spectra such as those shown at 39 and 43 in FIGURE 3. When the large hole 62 in member 56 is positioned over beta source 40, a beta radiation spectra such as that shown at 41 in FIGURE 3 may result. Since the target assembly or carriage is capable of movement to any position over the source of primary beta radiation 40, an infinite number of intermediate energy absorption spectra may be obtained.

While the carriage or target shown in FIGURE 5 utilizes a bell or wedge shaped end portion 56 and varying diameter apertures it will be apparent to those skilled in the art that other variable collimating arrangements may be used. One example of such an arrangement is shown in FIGURE 8. Referring to that figure, a carriage or target 82 is comprised of a plurality of target materials 84, 86, 88 and 90 of different atomic numbers as in the preceding embodiment of the invention. Attached to these elements is a stepped collimating member 92 having stepped portions 94, 96, 98 and 100 of different thicknesses. The minimum thickness portion 94 is provided with an aperture 102 of substantially the same diameter as the aperture in the capsule 104 containing source 106. The succeeding portions 96, 98 and 100 are provided with increasing numbers of apertures of the same size. An even further degree of collimation may be obtained if these latter apertures are of decreasing diameter.

For FIGURES 9 and 10 there is shown a still further embodiment of the invention wherein the movement of the carriage or target is rotary rather than reciprocating as in the preceding embodiments. Referring to these figures, there is shown a circular target 106 consisting of a hub 108 mounted on a shaft 110 which may be driven either by hand or by an automatic means such as a servomotor 112. Mounted on the hub 108 are a plurality of elements 114, 116, 118 and 120 of different atomic numbers which coincide with the elements 48, 50, 52 and 54 of the device in FIGURE 5. The remainder of the periphery of hub 108 has an arcuate member 122 attached thereto and this member increases in thickness from its juncture with element 120 at 124 to its juncture with element 114 at 126. A large aperture 128 is provided adjacent element 120 and juncture 124 and a progressively increasing number of apertures 130 of decreasing diameter is provided between aperture 128 and juncture 126 and element 114. The increasing thickness of arcuate section 122, as best seen in FIGURE 10, provides increasingly long collimating apertures as juncture 126 is approached.

A radiation source 132 is provided adjacent one face of the circular target 106 and a suitable detector 134 is placed opposite the other face on the far side of a material 136 to be gauged. Rotation of shaft 110 under control of motor 112 varies the mean energy of radiation reaching the material 136 as in the preceding embodiment of the invention.

It will thus be apparent to those skilled in the art that with a device of the type disclosed herein it is possible to measure an extremely large range of material characteristics, with a single instrument utilizing only one primary radiation source. In addition to this, the measurements may be made with the instrument or gauge operating under conditions which provide a high degree of accuracy. Both manual and power positioning devices may be used, and servo mechanisms may be utilized to provide an extremely accurate control. The target assembly may assume a variety of shapes, and various types of target motions may be used. Similarly the particular collimating arrangements shown are intended to be illustrative and not restrictive in nature, since other collimating arrangements will be apparent to those skilled in the art.

While the gauge shown herein provides one satisfactory method of utilizing the variable energy absorption spectra producing device of this invention, other gauges may be utilized. A particularly satisfactory alternative gauge is one utilizing a feedback positioning device to adjust the position of the target assembly or carriage to produce a particular level of received radiation flux in the detector. That is to say, the positioning device can be utilized to move the carriage in order to maintain this level of received radiation flux so that the position of the carriage indicates the particular parameter being measured. Other type gauge arrangements may also be utilized without departing from the spirit of this invention.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A target assembly for varying the mean energy level of radiation emitted by a radioactive source comprising a plurality of bremsstrahlung generators each having a different atomic number.

2. A target assembly for varying the mean energy level of radiation emitted by a radioactive source comprising a plurality of bremsstrahlung generators and a beta collimating section, said bremsstrahlung generators each having a different atomic number.

3. A target assembly for varying the means energy level of radiation emitted by a radioactive source comprising a plurality of bremsstrahlung generators each having a different atomic number, and a beta collimating section of varying width including series of collimating apertures of varying diameter.

4. In a measuring system utilizing a radioactive source for determining the variable absorption characteristics of the material under test, a target assembly for varying the mean energy level of radiation emitted by a radioactive source comprising a plurality of bremsstrahlung generator sections each having a different atomic number, means for restricting the radiation emitted by said source to an area of said assembly less than one of said sections, and means for altering the relative positions of said source and said assembly.

5. In a measuring system utilizing a radioactive source for determining the variable absorption characteristics of the material under test, a target assembly for varying the mean energy level of radiation emitted by said radioactive source comprising a plurality of bremsstrahlung generator sections each having a different atomic number, and a variable beta collimating section; means for restricting the radiation emitted by said source to an area of said assembly less than one of said sections, and means for altering the relative positions of said source and said assembly.

References Cited in the file of this patent

UNITED STATES PATENTS

| | | |
|---|---|---|
| 2,298,335 | Atlee | Oct. 13, 1942 |
| 2,467,812 | Clapp | Apr. 19, 1949 |
| 2,629,831 | Atchley | Feb. 24, 1953 |
| 2,678,399 | Fay | May 11, 1954 |
| 2,757,290 | Jacobs | July 31, 1956 |
| 2,797,333 | Reiffel | June 25, 1957 |

OTHER REFERENCES

Reiffel, "Beta-Ray-Excited X-Ray Sources," Proceedings of the International Conference on the Peaceful Uses of Atomic Energy, v. 15, pages 291–294, August 1955.